(12) United States Patent
Riviere et al.

(10) Patent No.: US 7,182,545 B2
(45) Date of Patent: Feb. 27, 2007

(54) STRUCTURAL ELEMENT FOR A MOTOR VEHICLE COMPRISING TWO METAL MEMBERS AND A REINFORCING PIECE OF PLASTICS MATERIAL WHICH BRINGS ABOUT THE CONNECTION OF THE MEMBERS, AND A CORRESPONDING MOTOR VEHICLE

(75) Inventors: Caroline Riviere, Valentigney (FR); Sebastien Berne, Luze (FR)

(73) Assignee: Faurecia Bloc Avant, Nanterre (FR)

( * ) Notice: Subject to any disclaimer, the term of this patent is extended or adjusted under 35 U.S.C. 154(b) by 33 days.

(21) Appl. No.: 11/018,805

(22) Filed: Dec. 22, 2004

(65) Prior Publication Data

US 2005/0140173 A1   Jun. 30, 2005

(30) Foreign Application Priority Data

Dec. 22, 2003   (FR) .................................. 03 15188

(51) Int. Cl.
*F16L 13/00* (2006.01)
*B62D 25/00* (2006.01)
*B62D 27/02* (2006.01)

(52) U.S. Cl. ............ 403/267; 296/187.01; 296/193.09; 296/29

(58) Field of Classification Search ................. 296/29, 296/193.09, 187.01; 403/267
See application file for complete search history.

(56) References Cited

U.S. PATENT DOCUMENTS

| | | | |
|---|---|---|---|
| 6,273,496 B1 * | 8/2001 | Guyomard et al. | .... 296/193.09 |
| 6,412,855 B1 * | 7/2002 | Cantineau et al. | ..... 296/187.01 |
| 2001/0053431 A1 | 12/2001 | Goldbach et al. | |
| 2003/0070387 A1 | 4/2003 | Klocke et al. | |
| 2004/0105949 A1 | 6/2004 | Krause | |

\* cited by examiner

*Primary Examiner*—Dennis H. Pedder
(74) *Attorney, Agent, or Firm*—Young & Thompson

(57) ABSTRACT

This structural element comprises a first (3) and a second (5) metal member, whose regions (23, 29) overlap and a reinforcing piece (7) of plastics material which is overmoulded on the first and second metal members, the reinforcing piece comprising at least a portion (45) for connecting the metal members. The overlap region (23) of the first member (3) comprises at least an anchoring recess (25) . The overlap region (29) of the second member (5) comprises at least a discrete zone (37) set-back from the second metal member (5) for securing the plastics material, and the connecting portion (45) extends into the set-back zone (37) in order to be engaged in the anchoring recess (25).

Used, for example, in the construction of front faces.

7 Claims, 6 Drawing Sheets

STRUCTURAL ELEMENT FOR A MOTOR VEHICLE COMPRISING TWO METAL MEMBERS AND A REINFORCING PIECE OF PLASTICS MATERIAL WHICH BRINGS ABOUT THE CONNECTION OF THE MEMBERS, AND A CORRESPONDING MOTOR VEHICLE

BACKGROUND OF THE INVENTION

1. Field of the Invention

The present invention relates to a structural element for a motor vehicle, of the type comprising:
- a first and a second distinct and separate metal members, overlap regions of the first and second metal members overlapping each other and
- a reinforcing piece of plastics material which is overmoulded on the first and second metal members, the reinforcing piece comprising at least a portion for connecting the metal members.

The invention is used in particular for constructing front faces for motor vehicles.

Such front faces are referred to as "hybrids" because of the combined use of metal and plastics material in their construction.

2. Related Art

US-2003/0070387 discloses a structural element of the above-mentioned type.

The connection parts are rivets which form part of the reinforcing piece of plastics material and which extend through holes provided in the overlap regions of the metal members.

SUMMARY OF THE INVENTION

An object of the invention is to provide a structural element using a different means of connecting the metal members.

To this end, the invention relates to a structural element of the above-mentioned type, characterised in that the overlap region of the first metal member comprises at least an anchoring recess which is provided in the first metal member for anchoring the plastics material, and the overlap region of the second metal member comprises at least a discrete zone set-back from an edge of the second metal member for securing the plastics material, and the connecting portion extends into the set-back zone in order to be engaged in the anchoring recess.

According to specific embodiments, the structural element can comprise one or more of the following features, taken in isolation or according to all technically feasible combinations:
- the discrete set-back zone has at least a portion which converges towards the outer side of the second member,
- the discrete set-back zone is of a stepped form having corners,
- the anchoring recess has a cross-section having at least an undercut,
- the anchoring recess has been provided by drawing the first metal member,
- the discrete set-back zone and the anchoring recess are arranged at least partially facing each other and
- the first and/or second metal member(s) comprise(s) limbs which together define a cavity, and the reinforcing piece comprises ribs which extend into the cavity between the limbs.

The invention also relates to a motor vehicle, characterised in that it comprises a structural element as defined above.

BRIEF DESCRIPTION OF THE DRAWINGS

The invention will be better understood from a reading of the description below, given purely by way of example and with reference to the appended drawings, in which.

DETAILED DESCRIPTION OF THE PREFERRED EMBODIMENTS

Hereinafter, the orientations used are the conventional orientations of a motor vehicle.

Figure 1:
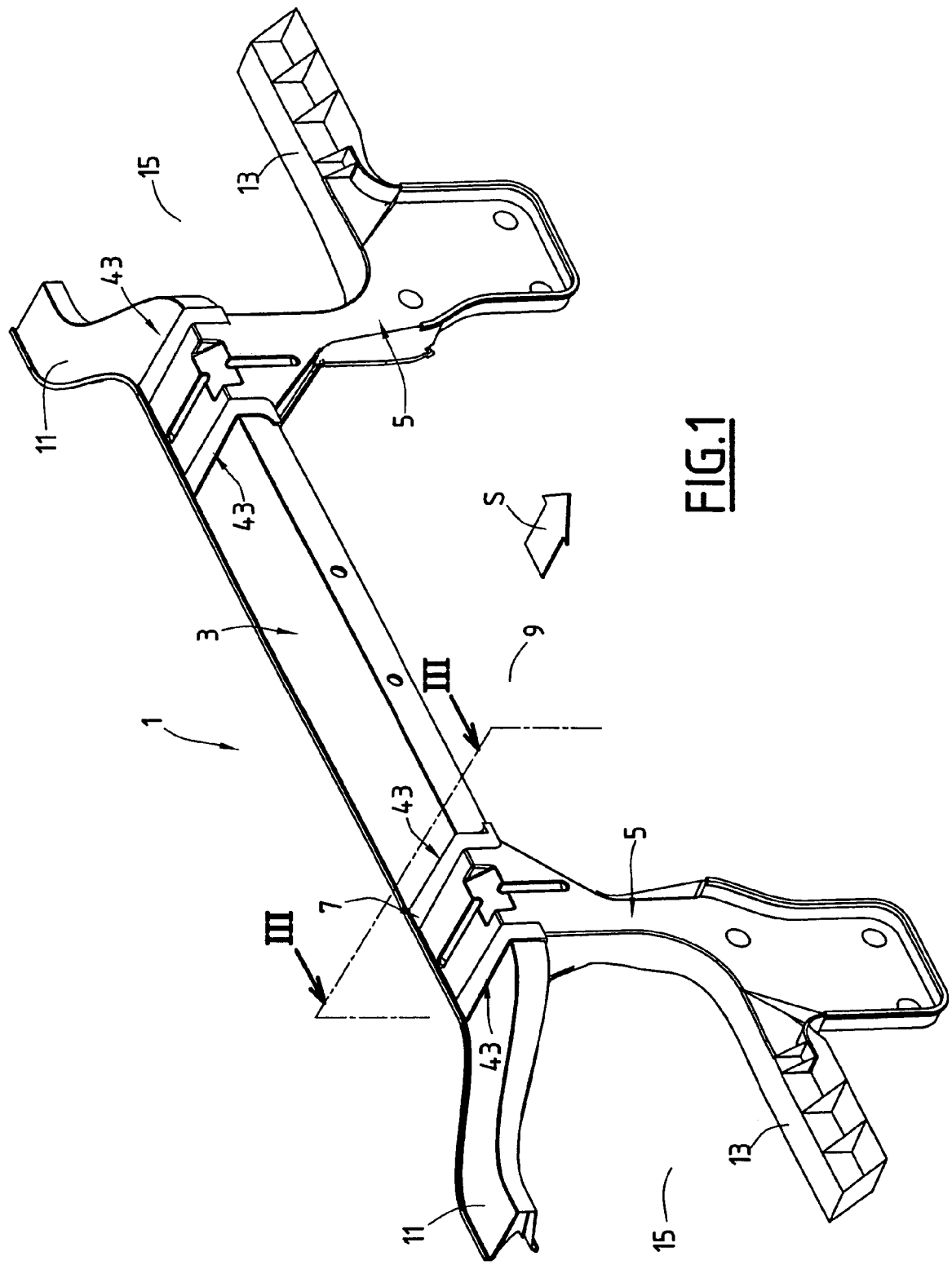
FIG. 1 is a schematic perspective view of a front face for a motor vehicle according to the invention.

Thus, the terms "front", "rear", "right", "left", "upper" and "lower" are to be understood in relation to the position of a driver and the direction of movement of the motor vehicle, indicated by an arrow S in FIG. 1.

FIG. 1 illustrates a front face 1 which comprises an upper metal cross-piece 3 which extends substantially horizontally and two lateral metal uprights 5 which extend substantially vertically.

The two lateral uprights 5 are spaced laterally apart from each other and extend downwards from the upper cross-piece 3.

The front face 1 further comprises a reinforcing piece 7 of plastics material which is overmoulded on the cross-piece 3 and the uprights 5.

Such a front face 1 is intended to be mounted at the front of a motor vehicle in order to support various pieces of equipment, such as light units, a motorised fan assembly (GMV), a radiator, a condenser.

In that manner, the uprights 5 together define a central space 9 for receiving, for example, a radiator, a condenser and a motorised fan assembly.

Similarly, the lateral ends 11 of the cross-piece 3 define, with arms 13 extending laterally outwards from the uprights 5, spaces 15 for receiving light units.

Figure 2:
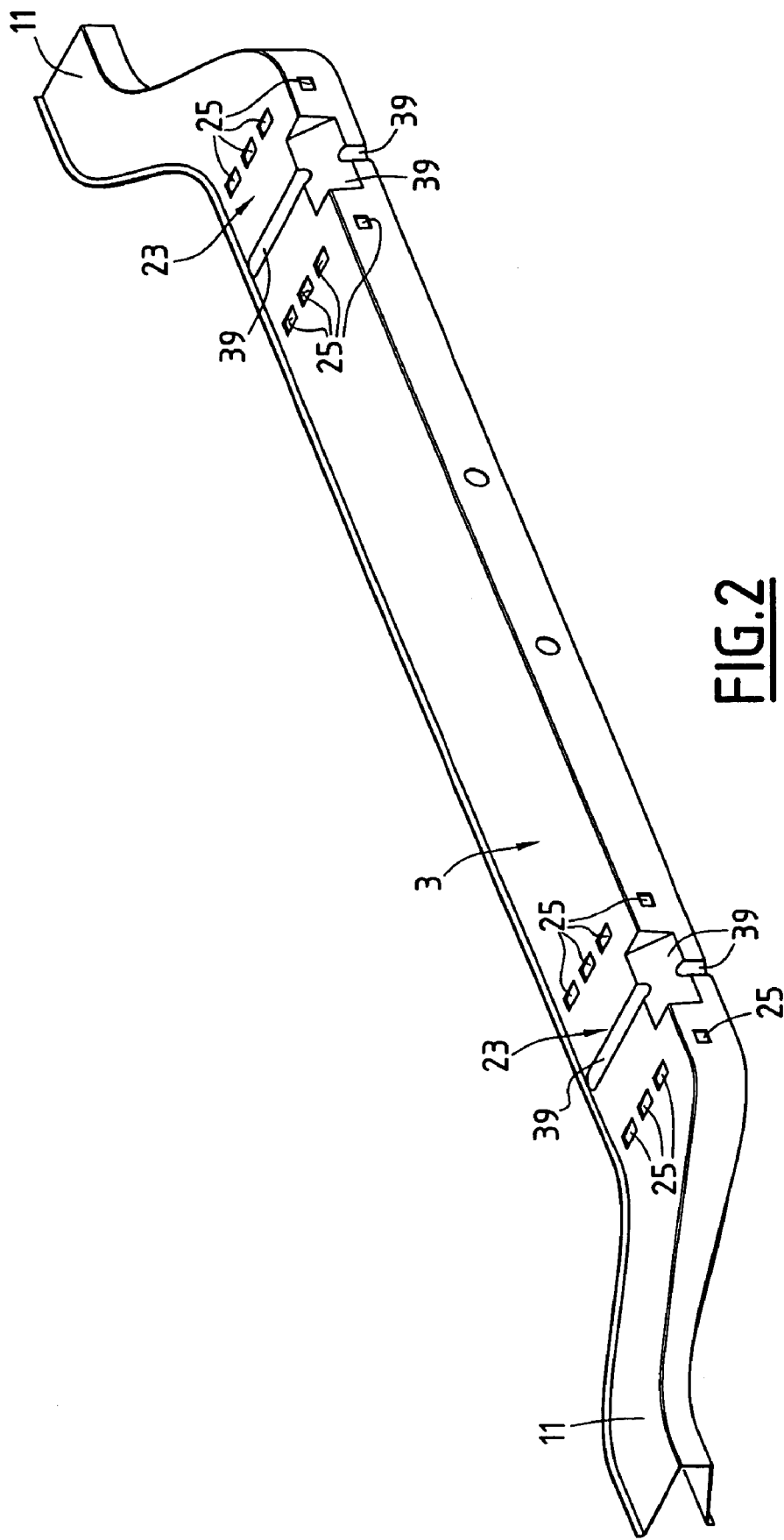
FIG. 2 is a schematic perspective view, drawn to an enlarged scale, of the upper metal cross-piece of the front face.
Figure 3:
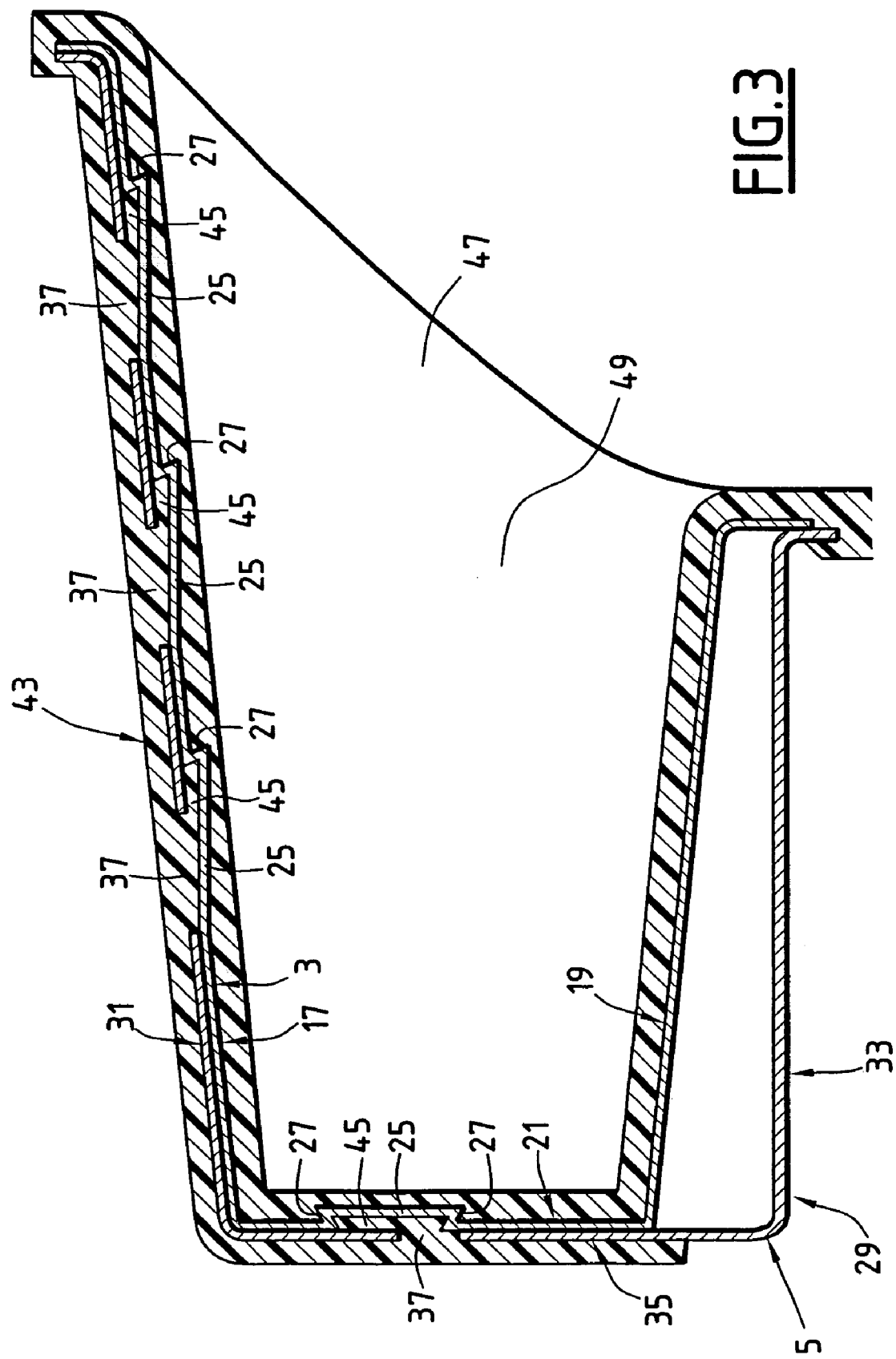
FIG. 3 is a schematic cross-section, drawn to an enlarged scale and taken in plane III—III of FIG. 1, illustrating the connection between the upper cross-piece and a metal upright of the front face of FIG. 1.

As illustrated in greater detail in FIGS. 2 and 3, the cross-piece 3 is a profiled member having a substantially V-shaped vertical section with an upper limb 17, a lower limb 19 and a base 21 which is arranged at the front and which connects the limbs 17 and 19. The cross-section of the cross-piece 3 is slightly flared towards the rear.

The upper cross-piece 3 comprises two regions 23 of overlap with the uprights 5. These regions 23 are spaced laterally apart from each other as well as from the lateral ends 11.

The cross-piece 3 has, beyond these regions 23, portions set back towards the rear which terminate in the lateral ends 11.

Each overlap region 23 is bordered laterally on both sides by a series of recesses 25 for anchoring the plastics material. The recesses 25 of each series are located substantially in the same vertical plane.

These recesses 25 have, for example, been produced by drawing the metal of the cross-piece 3. It will be appreciated that these recesses 25 are non-through reliefs provided in the cross-piece 3 and are not comparable to holes.

As can be seen in FIG. 3, each series comprises three recesses 25 which are provided in the upper limb 17. These recesses 25 open upwards and have a substantially triangular cross-section, whose tip is orientated towards the front. It will be appreciated that the rear sides 27 of the recesses 25 form undercut type steps, that is to say that they are, in the example illustrated, inclined upwards and forwards. The three recesses 25 are arranged one behind the other in a spaced-apart manner.

Each series further comprises a recess 25 provided in the base 21.

This recess 25, which opens towards the front, has, for example, a trapezoidal cross-section with two opposite sides 27 in an undercut arrangement. In the example illustrated, therefore, the two sides 27 converge towards the front.

Figure 4:
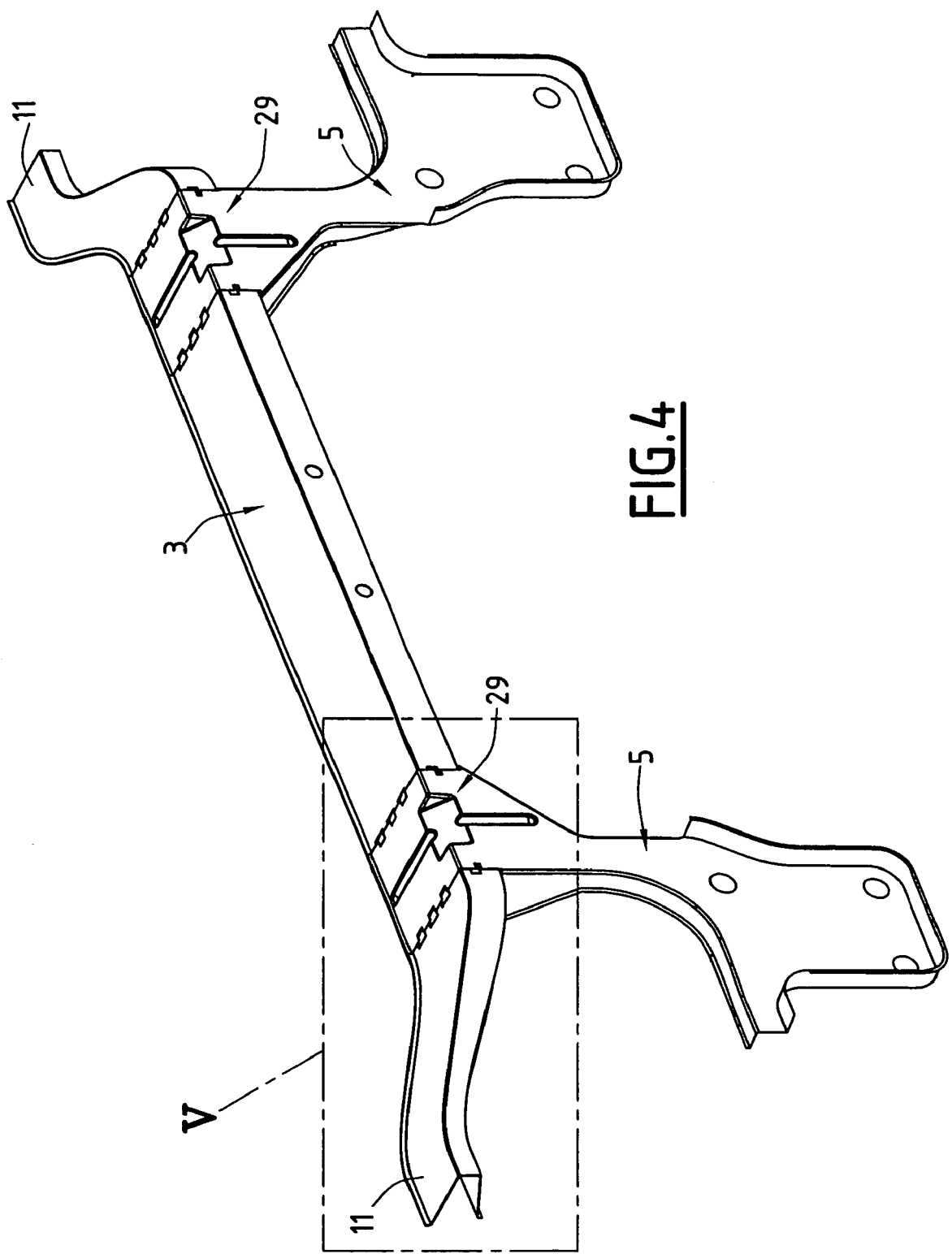
FIG. 4 is a view similar to FIG. 1, illustrating the front face of FIG. 1 before the reinforcing piece of plastics material is overmoulded.
Figure 5:
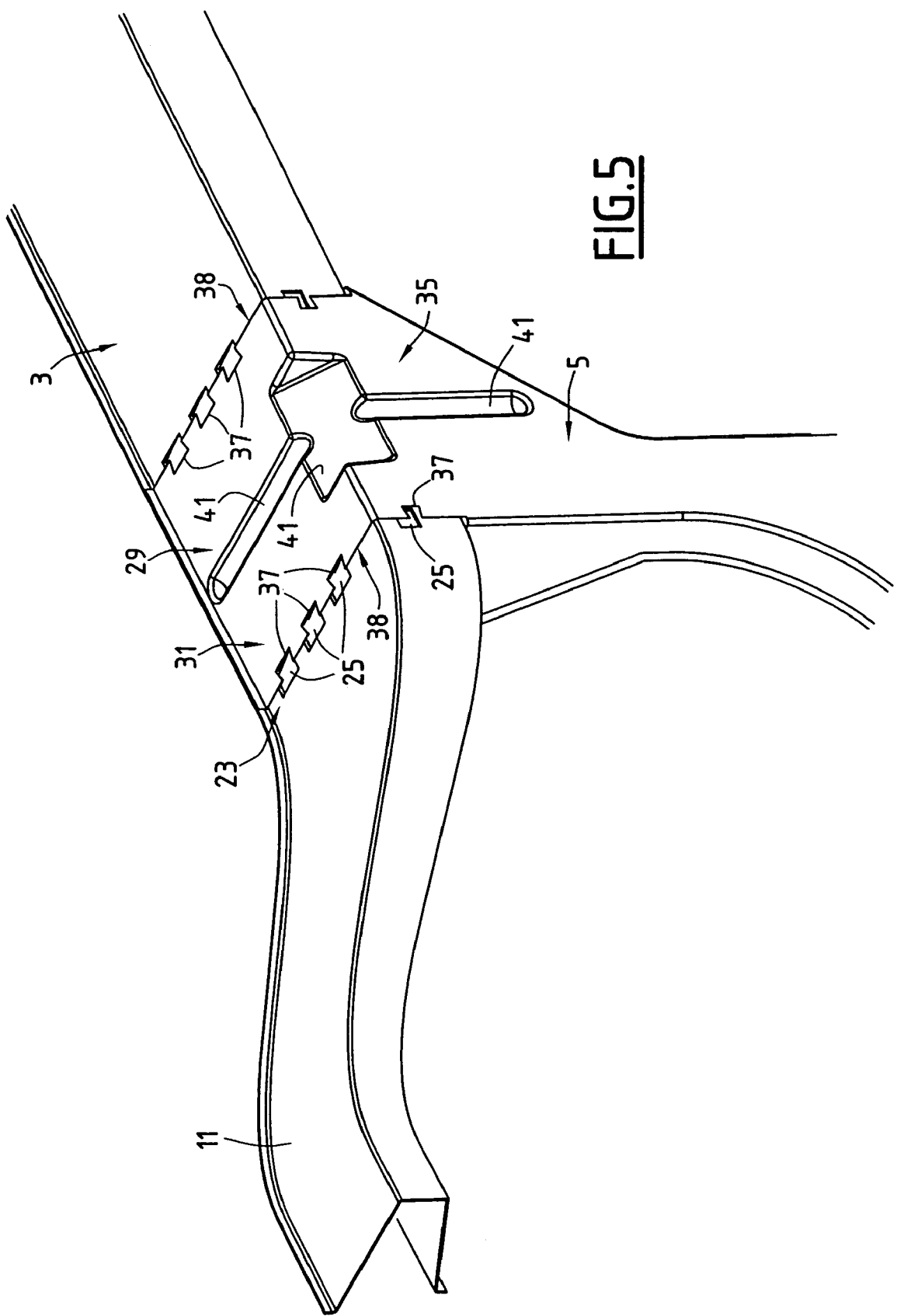
FIG. 5 is an enlarged schematic view of the part V of FIG. 4 and FIGS. 6 and 7 are partial, schematic views illustrating the shape of notches of the uprights of the front face according to variants of the invention.

As illustrated in greater detail in FIGS. 3 to 5, the upper ends 29 of the uprights 5 form regions which overlap the regions 23 of the cross-piece 3.

As is visible in FIG. 3, these overlap regions 29 also have a substantially V-shaped vertical section with an upper limb 31, a lower limb 33 and a base 35. This section substantially corresponds to that of the cross-piece 3, except that the base 35 is higher than the base 21 and the lower limb 33 is not inclined like the lower limb 19, but instead is substantially horizontal.

The uprights 5 are substantially of mutually symmetrical form relative to a vertical centre plane of the front face 1. Only the structure of the right-hand upright 5 (on the left in FIGS. 1, 4 and 5) and its connection to the cross-piece 3 will therefore be described below.

The upper limb 31 has a width corresponding substantially to the lateral spacing between the series of openings 25 of the corresponding overlap region 23. A series of set-back zones 37 is provided in each lateral edge 38 of the overlap region 29. These set-back zones 37 are discrete zones spaced apart from each other and serve, as will be seen below, to secure the plastics material to the upright 5. The zones 37 are, in this instance, trapezoidal notches which converge laterally towards the outer side of the overlap region 29.

In greater detail, each series comprises three notches 37 which are provided in the upper limb 31 and a notch 37 provided in the base 35.

As is visible in FIGS. 3 and 5, when the regions 23 and 29 are aligned, the notches 37 and the recesses 25 are arranged opposite and communicate with each other. It will be appreciated that the recesses 25 and the notches 37 provided in the bases 21 and 35 are only partially opposite each other.

The overlap regions 23 and 29 also comprise complementary reliefs 39 and 41 which are intended to fit in each other when the cross-piece 3 and the uprights 5 overlap via the regions 23 and 29 thereof.

In order to construct the front face 1, the regions 23 of the cross-piece 3 are engaged in the regions 29 of the uprights 5 so that those regions overlap, as illustrated by FIG. 4.

The upper limbs 17 and 31 and the bases 21 and 35 are then pressed against each other. The complementary reliefs 39 and 41 are engaged in each other.

The assembly formed in this manner is positioned in a mould where the plastics material intended to form the piece 7 is overmoulded on the cross-piece 3 and the uprights 5.

This plastics material forms in particular, as can be seen in FIG. 1, strips 43 which extend along the edges 38 of the overlap regions 29 of the uprights 5.

As illustrated by FIG. 3, the plastics material of these strips 43 extends into the notches 37 and is anchored in the recesses 25, thereby forming keys 45 for connecting the uprights 5 and the cross-piece 3. The strips 43 enclose the edges 38 in the region of the recesses 25 so that at least some of the sides of the notches 37 are embedded in the plastics material.

The keys 45 block relative movement of the uprights 5 and the cross-piece 3 and retain the cross-piece 3 relative to the upright 5, in particular owing to the anchoring of the keys 45 in the recesses 25. This anchoring is particularly effective owing to the sides 27 being in an undercut arrangement. The connection provided by the keys 45 between the cross-piece 3 and the uprights 5 is also effective because sides of the notches 37 are embedded in the plastics material, thereby bringing about a very good securing of the plastics material to the uprights 5. Furthermore, the converging form of the notches 37 further improves the securing of the plastics material to the uprights 5.

The plastics material of the reinforcing piece 7 also forms a network of ribs 47 which extend into the cavity 49 which is defined between the limbs 17 and 19 of the upper cross-piece 3.

As is visible in FIG. 3, where a rib 47 has been illustrated as a top view from the rear, although this is a cross-sectional view, these ribs 47 extend from the limb 17 as far as the limb 19. Similarly, the plastics material will form similar networks of ribs in the uprights 5. These ribs allow the front face 1 to be stiffened.

The plastics material of the piece 7 will also form the arms 13 which laterally extend the uprights 5.

In this manner, the front face 1 is rigid and has good mechanical strength, in particular with effective connections between the uprights 5 and the cross-piece 3. The front face 1 is further light and has a low production cost.

In one variant, the forms of the recesses 25 and the notches 37 can be different from those described above.

Thus, the notches 37 do not necessarily have forms converging outwards.

Figure 6:
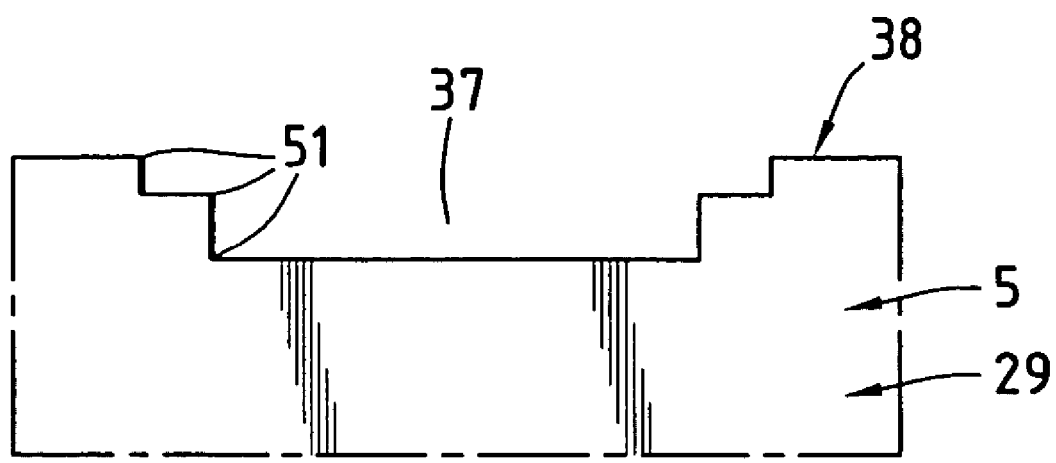

They can, for example, have stepped forms with corners 51, as are illustrated in FIG. 6, allowing a good securing of the plastics material to be produced.

Figure 7:
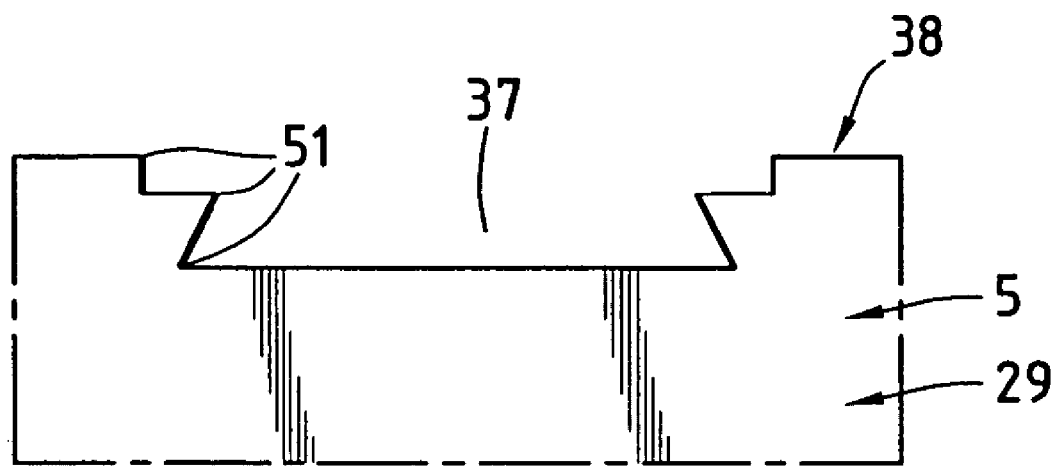

FIG. 7 further illustrates another variant with a stepped form, a portion of which is convergent.

Similarly, the recesses 25 do not necessarily have undercuts.

The invention can be used in the construction of structural elements other than front faces.

What is claimed is:

1. Structural element for a motor vehicle, of the type comprising:
    a first and a second distinct and separate metal members, overlap regions of the first and second metal members overlapping each other,
    a reinforcing piece of plastics material which is overmoulded on the first and second metal members, the reinforcing piece comprising at least a portion for connecting the metal members, characterised in that:

the overlap region of the first metal member comprises at least an non-through anchoring recess which is provided in the first metal member for anchoring the plastics material, the overlap region of the second metal member comprises at least a discrete notch provided on an edge of the second metal member for securing the plastics material, and the connecting portion extends into the notch in order to be engaged in the anchoring recess.

2. Structural element according to claim 1, characterised in that the discrete notch has at least a portion which converges towards the outer side of the second member.

3. Structural element according to claim 1, characterised in that the discrete notch is of a stepped form having corners.

4. Element according to claim 1, characterised in that the anchoring recess has a cross-section having at least an undercut.

5. Element according to claim 4, characterised in that the anchoring recess has been provided by drawing the first metal member.

6. Structural element according to claim 1, characterised in that the discrete notch and the anchoring recess are arranged at least partially facing each other.

7. Element according to claim 1, characterised in that the first and/or second metal member(s) comprise(s) limbs which together define a cavity, and in that the reinforcing piece comprises ribs which extend into the cavity between the limbs.

* * * * *